(12) United States Patent
Kakihara et al.

(10) Patent No.: US 7,563,858 B2
(45) Date of Patent: Jul. 21, 2009

(54) METHOD FOR STABLY PRODUCING AN AROMATIC POLYCARBONATE

(75) Inventors: Ichiro Kakihara, Kurashiki (JP); Hiroshi Hachiya, Kurashiki (JP)

(73) Assignee: Asahi Kasei Chemicals Corporation, Tokyo (JP)

( * ) Notice: Subject to any disclaimer, the term of this patent is extended or adjusted under 35 U.S.C. 154(b) by 272 days.

(21) Appl. No.: 10/593,035

(22) PCT Filed: Jun. 14, 2005

(86) PCT No.: PCT/JP2005/010860

§ 371 (c)(1),
(2), (4) Date: Sep. 15, 2006

(87) PCT Pub. No.: WO2005/121212

PCT Pub. Date: Dec. 22, 2005

(65) Prior Publication Data

US 2008/0255324 A1    Oct. 16, 2008

(30) Foreign Application Priority Data

Jun. 14, 2004 (JP) .............................. 2004-176206

(51) Int. Cl.
*C08G 64/00* (2006.01)
*C08G 63/00* (2006.01)
(52) U.S. Cl. ........................ 528/196; 422/129; 422/131; 502/150; 528/198; 528/480
(58) Field of Classification Search .................. 422/129, 422/131; 502/150; 528/196, 198, 480
See application file for complete search history.

(56) References Cited

U.S. PATENT DOCUMENTS

| 4,134,964 A * | 1/1979 | Ehlers et al. .............. 423/321.1 |
| 2002/0032299 A1 * | 3/2002 | Matsumoto et al. ......... 528/196 |

FOREIGN PATENT DOCUMENTS

| JP | 6-56984 A | 3/1994 |
| JP | 6-234845 A | 8/1994 |
| JP | 2003-34722 A | 2/2003 |

* cited by examiner

*Primary Examiner*—Terressa M Boykin
(74) *Attorney, Agent, or Firm*—Birch, Stewart, Kolasch & Birch, LLP (57) ABSTRACT

A method for stably producing an aromatic polycarbonate, which comprises continuously reacting an aromatic dihydroxy compound with a diaryl carbonate in a closed, reactor-pipeline system, the closed, reactor-pipeline system comprising: a plurality of reactors which are liquid-tightly connected through a pipeline toward an outlet for a final aromatic polycarbonate product, the pipeline comprising one or more pipes, wherein the plurality of reactors include at least two reactors connected in series, and at least one filter secured in the pipe or pipes of the reactor-pipeline system, wherein the or each filter is simultaneously or separately taken out to the outside of the reactor-pipeline system and subjected to washing in the outside of the reactor-pipeline system, followed by returning of the resultant washed filter into the inside of the pipe or pipes of the reactor-pipeline system, the washing being performed with the below-mentioned washing agents used in the following order: an aqueous solution of a basic compound, an aromatic monohydroxy compound, and a molten mixture of an aromatic dihydroxy compound and a diaryl carbonate, the molten mixture containing a basic compound.

5 Claims, 1 Drawing Sheet

FIG 1

METHOD FOR STABLY PRODUCING AN AROMATIC POLYCARBONATE

FIELD OF THE INVENTION

The present invention relates to a method for stably producing an aromatic polycarbonate. More particularly, the present invention is concerned with a method for stably producing an aromatic polycarbonate, which comprises continuously reacting an aromatic dihydroxy compound with a diaryl carbonate in a closed, reactor-pipeline system, the closed, reactor-pipeline system comprising: a plurality of reactors which are liquid-tightly connected through a pipeline toward an outlet for a final aromatic polycarbonate product, the pipeline comprising one or more pipes, wherein the plurality of reactors include at least two reactors connected in series, and at least one filter secured in the pipe or pipes of the reactor-pipeline system, wherein the or each filter is simultaneously or separately taken out to the outside of the reactor-pipeline system and subjected to washing in the outside of the reactor-pipeline system, followed by returning of the resultant washed filter into the inside of the pipe or pipes of the reactor-pipeline system, the washing being performed with a plurality of different washing agents used in a specific order. By the method of the present invention, there can be stably produced a colorless, high quality aromatic polycarbonate while solving the problems that an aromatic polycarbonate produced exhibits a great variation of terminal hydroxyl group ratio, the operation of the production equipment becomes unstable, and a marked product loss occurs due to a lowering of molecular weight or the like. Therefore, the method of the present invention is commercially very advantageous.

BACKGROUND OF THE INVENTION

In recent years, aromatic polycarbonates have been widely used in various fields as engineering plastics having excellent properties with respect to heat resistance, impact resistance and transparency. With respect to methods for producing aromatic polycarbonates, various studies have heretofore been made. Of the methods studied, a process utilizing an interfacial polycondensation between an aromatic dihydroxy compound, such as 2,2-bis(4-hydroxyphenyl)propane (hereinafter, frequently referred to as "bisphenol A"), and phosgene has been commercially practiced.

However, the interfacial polycondensation process has problems in that it is necessary to use phosgene, which is poisonous, that a reaction apparatus is likely to be corroded with chlorine-containing compounds, such as hydrogen chloride and sodium chloride, which are by-produced, and methylene chloride which is used as a solvent in a large quantity, and that difficulties are encountered in separating and removing impurities (such as sodium chloride) and residual methylene chloride, which adversely affect properties of a produced polymer. As a method for producing an aromatic polycarbonate from an aromatic dihydroxy compound and a diaryl carbonate, a melt transesterification process has conventionally been known, in which an aromatic polycarbonate is produced by performing an ester exchange reaction between an aromatic dihydroxy compound (such as bisphenol A) and a diaryl carbonate (such as diphenyl carbonate) in the molten state. Contrary to the interfacial polycondensation process, the melt transesterification process has an advantage in that a solvent need not be used. However, in the melt transesterification process, the reaction must be performed under high temperature and high vacuum conditions, thus posing a problem in that the produced aromatic polycarbonate is likely to suffer a discoloration. In addition, since the viscosity of a molten polycarbonate is high, it is difficult to remove foreign matter, especially foreign matter particles having an extremely small size, from the polycarbonate. The foreign matter particles having an extremely small size are causatives of optical defects and, when the obtained aromatic polycarbonate is used in the optical application field, especially in the production of an optical disk, the presence of extremely small foreign matter particles contained in the polycarbonate causes a bit-error. To solve this problem, there has been proposed a method in which the foreign matter materials are removed from low viscosity materials, such as raw materials or a reaction mixture in the early stage of the polymerization reaction.

In this situation, the present inventors proposed a method for producing a colorless aromatic polycarbonate by a melt transesterification reaction in a stainless steel reactor, wherein the stainless steel reactor is washed with a liquid containing an aromatic hydroxyl compound (see, for example, Patent Document 1). By the use of this method, it became possible to produce an aromatic polycarbonate having highly improved colorlessness. However, from the later studies, it became apparent that this method has the following problems. With respect to the aromatic polycarbonate obtained at the beginning of the production process which is started after the washing of the reactor, the terminal hydroxyl group ratio of the produced aromatic polycarbonate is likely to become varied and, hence, a production loss is likely to occur.

As another proposal for reducing the amount of foreign matter contained in an aromatic polycarbonate, there can be mentioned a method in which an aromatic polycarbonate is produced using a reactor-pipeline system containing at least two reactors, wherein a filter is secured in a pipe of the reactor-pipeline system at a position upstream of a final reactor (see, for example, Patent Document 2). Further, there can be mentioned a method in which the above-mentioned reactor-pipeline system is provided with a filter switching device for switching between filters for alternative use in the reactor-pipeline system (see, for example, Patent Document 3). In this method, before performing a switching from a used filter to a new filter which are set in the filter switching device of the reactor-pipeline system, the new filter is subjected to washing with a washing agent which is an aromatic hydroxyl compound containing a basic compound, followed by discharge of the used washing agent to the outside of the reactor-pipeline system. After the discharge of the used washing agent, the used filter is switched to the washed new filter by the filter switching device. The amount of extremely small foreign matter particles contained in the produced aromatic polycarbonate was considerably decreased by this method. However, in this method, it is necessary that a new filter set in the filter switching device be washed for a long period of time. Further, with respect to the aromatic polycarbonate obtained at the beginning of the production process which is started after the washing of the filter, the terminal hydroxyl group ratio is likely to be varied and, hence, a production loss is likely to occur.

Patent Document 1: Unexamined Japanese Patent Application Laid-Open Specification No. Hei 6-56984

Patent Document 2: Unexamined Japanese Patent Application Laid-Open Specification No. Hei 6-234845

Patent Document 3: Unexamined Japanese Patent Application Laid-Open Specification No. 2003-34722

DISCLOSURE OF THE INVENTION

Problems to be Solved by the Invention

An object of the present invention is to provide a method for stably producing a colorless aromatic polycarbonate, wherein the method can be used to stably produce a high quality aromatic polycarbonate while solving the problems that an aromatic polycarbonate produced exhibits a great variation of terminal hydroxyl group ratio, the operation of the production equipment becomes unstable, and a marked product loss occurs due to a lowering of molecular weight or the like.

Means to Solve the Problems

In this situation, for solving the above-mentioned problems, the present inventors have made extensive and intensive studies. As a result, they have unexpectedly found that, in the production of an aromatic polycarbonate by reacting an aromatic dihydroxy compound with a diaryl carbonate in a reactor-pipeline system containing a filter, the object of the present invention can be easily accomplished by performing a process in which the filter is taken out to the outside of the reactor-pipeline system and subjected to washing in the outside of the reactor-pipeline system, followed by returning of the resultant washed filter into the inside of a pipe of the reactor-pipeline system, wherein the washing is performed with the below-mentioned washing agents used in the following order: an aqueous solution of a basic compound, an aromatic monohydroxy compound, and a molten mixture of an aromatic dihydroxy compound and a diaryl carbonate, the molten mixture containing a basic compound in an amount of from 1 to 10,000 ppb. The present invention has been completed, based on this novel finding. In the present invention, by the above-mentioned washing performed with the above-mentioned specific washing agents (namely an aqueous solution of a basic compound, an aromatic monohydroxy compound, and a molten mixture of an aromatic dihydroxy compound and a diaryl carbonate, the molten mixture containing a basic compound in an amount of from 1 to 10,000 ppb) which are used in the specific order, there can be obtained efficient cleaning of the filter while suppressing the variation of the terminal hydroxyl group ratio of the aromatic polycarbonate produced, thereby enabling stable production of a high quality aromatic polycarbonate. Such effects of the method of the present invention are quite unexpected from the prior art.

The foregoing and other objects, features and advantages of the present invention will be apparent from the following detailed description taken in connection with the accompanying drawing, and the appended claims.

Effects of the Invention

The method of the present invention exhibits the excellent effects that, in production of an aromatic polycarbonate by performing a melt polycondensation reaction in a reactor-pipeline system containing a filter, there can be obtained efficient cleaning of the filter while solving the problems that an aromatic polycarbonate produced exhibits a great variation of terminal hydroxyl group ratio, the operation of the production equipment becomes unstable, and a marked product loss occurs due to a lowering of molecular weight and to discoloration.

DESCRIPTION OF REFERENCE NUMERALS 1a, 1b: Inlet for raw materials
2a, 2b, 9, 19, 28, 36, 46: Vent
3a, 3b: Melt-mixing vessel for melting raw materials
4a, 4b, 18, 27, 39: Agitator
5a, 5b: Molten mixture
11, 20, 29, 47: Molten polymer
6a, 6b, 12, 21, 30, 37, 48: Outlet
7a, 7b, 13, 15, 24, 33, 40, 50: Pipe
8, 16, 25, 34, 41: Inlet
10: Reservoir
14, 23, 32, 38, 49: Transfer pump
17: First vertical agitation type polymerizer vessel
22, 31, 45: Gas feed port
26: Second vertical agitation type polymerizer vessel
35: Horizontal twin-screw agitation type polymerizer
42: Wire-wetting fall polymerizer
43: Perforated plate
44: Wire
51: Withdrawal port
52: Filter

BEST MODE FOR CARRYING OUT THE INVENTION

According to the present invention, there is provided a method for stably producing an aromatic polycarbonate, which comprises continuously reacting an aromatic dihydroxy compound with a diaryl carbonate in a closed, reactor-pipeline system, the closed, reactor-pipeline system comprising:

a plurality of reactors which are liquid-tightly connected through a pipeline toward an outlet for a final aromatic polycarbonate product, the pipeline comprising one or more pipes, wherein the plurality of reactors include at least two reactors connected in series, and at least one filter secured in the pipe or pipes of the reactor-pipeline system, wherein the or each filter is simultaneously or separately taken out to the outside of the reactor-pipeline system and subjected to washing in the outside of the reactor-pipeline system, followed by returning of the resultant washed filter into the inside of the pipe or pipes of the reactor-pipeline system, the washing being performed with the below-mentioned washing agents used in the following order:

an aqueous solution of a basic compound, an aromatic monohydroxy compound, and a molten mixture of an aromatic dihydroxy compound and a diaryl carbonate, the molten mixture containing a basic compound in an amount of from 1 to 10,000 ppb.

For easier understanding of the present invention, the essential features and various preferred embodiments of the present invention are enumerated below.

1. A method for stably producing an aromatic polycarbonate, which comprises continuously reacting an aromatic dihydroxy compound with a diaryl carbonate in a closed, reactor-pipeline system,
the closed, reactor-pipeline system comprising:
a plurality of reactors which are liquid-tightly connected through a pipeline toward an outlet for a final aromatic polycarbonate product, the pipeline comprising one or more pipes, wherein the plurality of reactors include at least two reactors connected in series, and
at least one filter secured in the pipe or pipes of the reactor-pipeline system,
wherein the or each filter is simultaneously or separately taken out to the outside of the reactor-pipeline system and subjected to washing in the outside of the reactor-pipeline system, followed by returning of the resultant washed filter into the inside of the pipe or pipes of the reactor-pipeline system,
the washing being performed with the below-mentioned washing agents used in the following order:
an aqueous solution of a basic compound,
an aromatic monohydroxy compound, and
a molten mixture of an aromatic dihydroxy compound and a diaryl carbonate, the molten mixture containing a basic compound in an amount of from 1 to 10,000 ppb.

2. The method according to item 1 above, wherein the aqueous solution of a basic compound has a pH value of from 7.5 to 10.

3. The method according to item 1 or 2 above, wherein the basic compound is an alkali metal hydroxide.

4. The method according to item 3 above, wherein said alkali metal hydroxide is at least one member selected from the group consisting of sodium hydroxide and potassium hydroxide.

5. The method according to any one of items 1 to 4, wherein said aromatic dihydroxy compound is phenol.

Hereinbelow, the present invention is described in detail.

In the present invention, the terminology "aromatic dihydroxy compound" means a compound represented by the following formula:

HO—Ar—OH wherein Ar represents a divalent aromatic group.

Preferred examples of divalent aromatic groups (Ar groups) include a group represented by the following formula:

—Ar¹—Y—Ar²— wherein each of Ar¹ and Ar² independently represents a divalent carbocyclic or heterocyclic aromatic group having 5 to 70 carbon atoms, and Y represents a divalent alkane group having 1 to 30 carbon atoms.

In the divalent carbocyclic or heterocyclic aromatic groups Ar¹ and Ar², at least one hydrogen atom may be replaced by a substituent which does not adversely affect the reaction, such as a substituent selected from the group consisting of a halogen atom, an alkyl group having 1 to 10 carbon atoms, an alkoxy group having 1 to 10 carbon atoms, a phenyl group, a phenoxy group, a vinyl group, a cyano group, an ester group, an amide group and a nitro group.

Preferred examples of heterocyclic aromatic groups Ar¹ and Ar² include an aromatic group having at least one heteroatom, such as a nitrogen atom, an oxygen atom or a sulfur atom. Examples of divalent aromatic groups Ar¹ and Ar² include an unsubstituted or substituted phenylene group, an unsubstituted or substituted biphenylene group and an unsubstituted or substituted pyridylene group. Substituents for divalent aromatic groups Ar¹ and Ar² are as described above.

Examples of divalent alkane groups (Y groups) include organic groups respectively represented by the following formulae (1):

wherein each of $R^1$, $R^2$, $R^3$ and $R^4$ independently represents a hydrogen atom, an alkyl group having 1 to 10 carbon atoms, an alkoxy group having 1 to 10 carbon atoms, a cycloalkyl group having 5 to 10 ring-forming carbon atoms, a carbocyclic aromatic group having 5 to 10 ring-forming carbon atoms or a carbocyclic aralkyl group having 6 to 10 ring-forming carbon atoms; k represents an integer of from 3 to 11; each X represents a carbon atom and has $R^5$ and $R^6$ bonded thereto; each $R^5$ independently represents a hydrogen atom or an alkyl group having 1 to 6 carbon atoms, and each $R^6$ independently represents a hydrogen atom or an alkyl group having 1 to 6 carbon atoms, wherein $R^5$ and $R^6$ are the same or different; and wherein, in each of $R^1$, $R^2$, $R^3$, $R^4$, $R^5$ and $R^6$, at least one hydrogen atom may be replaced by a substituent which does not adversely affect the reaction, such as a substituent selected from the group consisting of a halogen atom, an alkyl group having 1 to 10 carbon atoms, an alkoxy group having 1 to 10 carbon atoms, a phenyl group, a phenoxy group, a vinyl group, a cyano group, an ester group, an amide group and a nitro group.

Specific examples of divalent aromatic groups (Ar groups) include groups respectively represented by the following formulae (2):

wherein each of $R^7$ and $R^8$ independently represents a hydrogen atom, a halogen atom, an alkyl group having 1 to 10 carbon atoms, an alkoxy group having 1 to 10 carbon atoms, a cycloalkyl group having 5 to 10 ring-forming carbon atoms, or a phenyl group; each of m and n independently represents an integer of from 1 to 4, with the proviso that when m is an integer of from 2 to 4, the $R^7$'s are the same or different, and when n is an integer of from 2 to 4, the $R^8$'s are the same or different.

Further examples of divalent aromatic groups (Ar groups) include a group represented by the following formula:

—$Ar^1$-Z-$Ar^2$— wherein $Ar^1$ and $Ar^2$ are as defined above; and Z represents a single bond or a divalent group, such as —O—, —CO—, —S—, —SO$_2$—, —SO—, —COO—, or —CON($R^1$)—, wherein $R^1$ is as defined above.

Specific examples of such divalent aromatic groups (Ar groups) include groups respectively represented by the following formulae (3):

wherein $R^7$, $R^8$, m and n are as defined above.

Further specific examples of divalent aromatic groups (Ar groups) include an unsubstituted or substituted phenylene group, an unsubstituted or substituted naphthylene group, and an unsubstituted or substituted pyridylene group. In the method of the present invention, the aromatic dihydroxy compounds can be used individually or in combination. Representative examples of aromatic dihydroxy compounds include bisphenol A. The diaryl carbonate used in the present invention is represented by the following formula (4):

(4)

wherein each of $Ar^3$ and $Ar^4$ independently represents a monovalent aromatic group.

In each of $Ar^3$ and $Ar^4$, which independently represents a monovalent carbocyclic or heterocyclic aromatic group, at least one hydrogen atom may be replaced by a substituent which does not adversely affect the reaction, such as a substituent selected from the group consisting of a halogen atom, an alkyl group having 1 to 10 carbon atoms, an alkoxy group having 1 to 10 carbon atoms, a phenyl group, a phenoxy group, a vinyl group, a cyano group, an ester group, an amide group and a nitro group. $Ar^3$ and $Ar^4$ are the same or different.

Representative examples of monovalent aromatic groups $Ar^3$ and $Ar^4$ include a phenyl group, a naphthyl group, a biphenyl group and a pyridyl group. These groups may or may not be substituted with the above-mentioned substituent or substituents. Preferred examples of monovalent aromatic groups $Ar^3$ and $Ar^4$ include those which are respectively represented by the following formulae (5):

(5)

Representative examples of diaryl carbonates include an unsubstituted or substituted diphenyl carbonate compound represented by the following formula (6):

(6)

wherein each of $R^9$ and $R^{10}$ independently represents a hydrogen atom, an alkyl group having 1 to 10 carbon atoms, an alkoxy group having 1 to 10 carbon atoms, a cycloalkyl group having 5 to 10 ring-forming carbon atoms or a phenyl group; each of p and q independently represents an integer of from 1 to 5, with the proviso that when p is an integer of 2 or more, the $R^9$'s are the same or different, and when q is an integer of 2 or more, the $R^{10}$'s are the same or different.

Of these diaryl carbonates, preferred are diaryl carbonates having a symmetrical configuration, such as (unsubstituted) diphenyl carbonate and a diphenyl carbonate substituted with a lower alkyl group, e.g., ditolyl carbonate and di-tert-butylphenyl carbonate. Especially preferred is diphenyl carbonate, which is the diaryl carbonate having the simplest structure. These diaryl carbonates can be used individually or in combination.

The ratio (i.e., a charging ratio) in which the aromatic dihydroxy compound and the diaryl carbonate are used may vary depending on the types of the aromatic dihydroxy compound and diaryl carbonate employed, and the polymerization conditions (such as a polymerization temperature). The diaryl carbonate is generally used in an amount of from 0.9 to 2.5 mol, preferably from 0.95 to 2.0 mol, more preferably from 0.98 to 1.5 mol, per mol of the aromatic dihydroxy compound.

In the present invention, an aromatic dihydroxy compound and a diaryl carbonate are subjected to melt polycondensation to thereby produce an aromatic polycarbonate. The number average molecular weight of the aromatic polycarbonate obtained according to the method of the present invention is generally from 5,000 to 100,000, preferably from 5,000 to 30,000. The melt polycondensation is generally performed at a temperature of from 50 to 350° C., preferably from 150 to 290° C. As the reaction proceeds, an aromatic monohydroxy compound is by-produced. By removing the aromatic monohydroxy compound from the reaction system, the reaction rate can be increased. Therefore, in the method of the present invention, it is preferable to employ a method in which an inert gas which does not adversely affect the reaction, such as nitrogen gas, argon gas, helium gas, carbon dioxide gas or a lower hydrocarbon gas, is introduced so as to remove the by-produced aromatic monohydroxy compound in such a form as entrained by the inert gas; or a method in which the reaction is carried out under reduced pressure. A suitable reaction pressure is selected depending on the molecular weight of the aromatic polycarbonate in the reaction system. For example, at an initial stage of the polymerization, it is preferred that the reaction pressure is in the range of from 10 mmHg to atmospheric pressure. On the other hand, at a late stage of the polymerization, it is preferred that the reaction pressure is 20 mmHg or less, more advantageously 10 mmHg or less, still more advantageously 2 mmHg or less.

The method of the present invention employs a combination of a plurality of reactors which are connected through a pipeline comprising one or more pipes. The reaction between the aromatic dihydroxy compound and the diaryl carbonate can be performed in a batchwise manner or in a continuous manner. Further, in the present invention, the melt polycondensation reaction can be performed without using a catalyst. However, if desired, the reaction can also be performed in the presence of a catalyst for the purpose of increasing the polymerization rate. With respect to the catalyst, there is no particular limitation as long as the catalyst is conventionally used in the art. Examples of catalysts include: hydroxides of an alkali metal and of an alkaline earth metal, such as lithium hydroxide, sodium hydroxide, potassium hydroxide and calcium hydroxide; alkali metal salts, alkaline earth metal salts and quaternary ammonium salts of boron hydride and of aluminum hydride, such as lithium aluminum hydride, sodium borohydride and tetramethylammonium borohydride; hydrides of an alkali metal and of an alkaline earth metal, such as lithium hydride, sodium hydride and calcium hydride; alkoxides of an alkali metal and of an alkaline earth metal, such as lithium methoxide, sodium ethoxide and calcium methoxide; aryloxides of an alkali metal and of an alkaline earth metal, such as lithium phenoxide, sodium phenoxide, magnesium phenoxide, LiO—Ar—OLi wherein Ar represents an aryl group, and NaO—Ar—ONa wherein Ar is as defined above; organic acid salts of an alkali metal and of an alkaline earth metal, such as lithium acetate, calcium acetate and sodium benzoate; zinc compounds, such as zinc oxide, zinc acetate and zinc phenoxide; boron compounds, such as boron oxide, boric acid, sodium borate, trimethyl borate, tributyl borate, triphenyl borate, ammonium borates represented by the formula: $(R^1R^2R^3R^4)NB(R^1R^2R^3R^4)$ wherein $R^1$, $R^2$, $R^3$ and $R^4$ are as defined for formula (1) above, and phosphonium borates represented by the formula: $(R^1R^2R^3R^4)PB(R^1R^2R^3R^4)$ wherein $R^1$, $R^2$, $R^3$ and $R^4$ are as defined for formula (1) above; silicon compounds, such as silicon oxide, sodium silicate, tetraalkylsilicon, tetraarylsilicon and diphenyl-ethyl-ethoxysilicon; germanium compounds, such as germanium oxide, germanium tetrachloride, germanium ethoxide and germanium phenoxide; tin compounds, such as tin oxide, dialkyltin oxide, dialkyltin carboxylate, tin acetate, tin compounds having an alkoxy group or aryloxy group bonded to tin (e.g., ethyltin tributoxide), and organotin compounds; lead compounds, such as lead oxide, lead acetate, lead carbonate, basic lead carbonate, and alkoxides and aryloxides of lead or organolead; onium compounds, such as a quaternary ammonium salt, a quaternary phosphonium salt and a quaternary arsonium salt; antimony compounds, such as antimony oxide and antimony acetate; manganese compounds, such as manganese acetate, manganese carbonate and manganese borate; titanium compounds such as titanium oxide, and alkoxides and aryloxides of titanium; and zirconium compounds, such as zirconium acetate, zirconium oxide, alkoxides and aryloxides of zirconium, and zirconium acetylacetone.

These catalysts can be used individually or in combination. The amount of the catalyst used is generally from $10^{-8}$ to 1 part by weight, preferably from $10^{-7}$ to $10^{-1}$ part by weight, relative to 100 parts by weight of the aromatic dihydroxy compound.

In the method of the present invention, the production of an aromatic polycarbonate is continuously performed in a closed, reactor-pipeline system which comprises a plurality of reactors including at least two reactors connected in series, and at least one filter secured in the pipe or pipes of the reactor-pipeline system.

In the present invention, there is no particular limitation with respect to the reactors so long as they are employable for producing an aromatic polycarbonate. Examples of reactors include an agitation type reactor vessel; a wiped film type reactor; a centrifugal wiped film evaporation type reactor; a surface-renewal type twin-crew kneading reactor; a twin-screw horizontal agitation type reactor; a wall-wetting fall rector; a free-fall polymerizer having a perforated plate; a wire-wetting fall reactor having a perforated plate and at least one wire provided in association with the perforated plate. These various types of reactors can be used individually or in combination. In the present invention, with respect to the material of the reactors, there is no particular limitation, and any material which is generally used in reactors for use in the production of an aromatic polycarbonate, can be used. It is preferred that at least the liquid-contacting portion of a reactor is comprised of a material which has an iron content of 20% or more. Further, from the viewpoint of processability, it is especially preferred to use stainless steel.

Examples of stainless steels include those which are described in "Sutenresukou Binran (Handbook of Stainless Steel)", 5th edition, pp. 13 to 21 (published by THE NIKKAN KOGYO SHIMBUN, LTD., Japan), that is, stainless steels which generally contain 10 to 30% by weight of chromium (e.g., martensitic stainless steel, ferritic stainless steel, austenitic stainless steel and ferritic-austenitic stainless steel). Specific examples of stainless steels include SUS201, SUS202, SUS304, SUS304L, SUS316, SUS316L, SUS347, SUS405, SUS430, SUS403, SUS410, SUS431, SUS440C and SUS630; however, stainless steels usable in the present invention are not limited to those mentioned above. Among the above-mentioned stainless steels, it is preferred to use SUS304, SUS304L, SUS316 and SUS316L. Further, stainless steel may be subjected to surface treatment, such as passivation, acid washing or buffing.

In the method of the present invention, an aromatic dihydroxy compound is reacted with a diaryl carbonate in a closed, reactor-pipeline system comprising a plurality of reactors which are liquid-tightly connected through a pipeline toward an outlet for a final aromatic polycarbonate product, the pipeline comprising one or more pipes, wherein the plurality of reactors include at least two reactors connected in series, and at least one filter secured in the pipe or pipes of the reactor-pipeline system. In the present invention, the term "closed, reactor-pipeline system" means a reactor-pipeline system in which a plurality of reactors are liquid-tightly connected through a pipeline toward an outlet for a final aromatic polycarbonate product, except that the liquid-tight connection does not cover necessary openings, such as an inlet for raw materials, vents and an outlet for a final aromatic polycarbonate product. In the above-mentioned reactor-pipeline system, at least two reactors are connected in series. If desired, all of the reactors contained in the reactor-pipeline system may be connected in series. In the reactor-pipeline system, as long as at least two reactors are connected in series, at least two reactors may be connected in parallel. For example, when the reactor-pipeline system contains at least two reactors which are connected in parallel, it is possible to perform an operation in which an initial transesterification reaction of an aromatic dihydroxy compound with a diaryl carbonate is performed in the reactors which are connected in parallel, wherein the reactors connected in parallel are alternately operated in a batchwise manner. With respect to the filter(s) secured in the pipe or pipes of the reactor-pipeline system, when a plurality of filters are used, all of the reactors in the system may individually have a filter secured in a pipe at a position upstream of each reactor. Alternatively, not all of the reactors in the system may individually have a filter secured in a pipe at a position upstream of each reactor. In the present invention, it is preferred that the filter is secured at a position which enables the filtration of an aromatic polycarbonate having a number average molecular weight of not more than 2,000, more advantageously at a position which enables the filtration of a molten mixture of an aromatic dihydroxy compound and a diaryl carbonate. In the continuous production of an aromatic polycarbonate, it is preferred that the reactor-pipeline system contains a plurality of filters which are connected in parallel in case of clogging of a filter. In such reactor-pipeline system, when the clogging of one filter occurs, the clogged filter can be easily switched to a new clean filter without discontinuing the continuous production operation of the reactor-pipeline system. When the clogging of the filter is unlikely to occur, a single filter is satisfactory. In the case of the use of a single filter, the filter is washed at the time when the operation of the reactor-pipeline system is discontinued for performing, e.g., a periodical inspection of the system. Further, when an unused, new filter is put to use, the unused, new filter may be washed before it is secured in the pipe or pipes of the reactor-pipeline system.

In the present invention, it is preferred that the taking-out of the filter to the outside of the reactor-pipeline system is performed at least at one predetermined point in time during the period of from a point in time before the reaction to a point in time after the reaction. For example, the filter can be taken out to the outside of the reactor-pipeline system at any of the following points in time: the point in time at which clogging of the filter has caused the pressure exerted on the filter or pipeline to reach a level close to the pressure resistance limit of the filter or pipeline; the point in time at which clogging of the filter has either caused a marked increase in the variation of the terminal hydroxyl group ratio of the aromatic polycarbonate produced or caused necessity of lowering the production rate of the reactor-pipeline system; and the point in time at which the filtration ability has become lowered to cause discoloration of the aromatic polycarbonate produced. The clogging of the filter can be confirmed using pressure sensors respectively provided at positions upstream and down-stream of the filter.

When the reactor-pipeline system contains a plurality of filters, the filters can be taken out to the outside of the reactor either simultaneously or separately.

In the present invention, the washing of the filter is performed in the outside of the reactor-pipeline system with the specific washing agents used in the specific order. Specifically, in the outside of the reactor-pipeline system, the filter is washed with the below-mentioned washing agents used in the following order:

an aqueous solution of a basic compound,
an aromatic monohydroxy compound, and
a molten mixture of an aromatic dihydroxy compound and a diaryl carbonate, the molten mixture containing a basic compound in an amount of from 1 to 10,000 ppb.

Examples of the types of filters used in the present invention include a depth type filter which removes impurities by capturing solid matter, such as particles, in the pores of the filter; and a screen type filter which captures solid matter by sifting at the surface of the filter. Representative examples of screen type filters include a wire mesh and a fluororesin membrane filter. The screen type filter has disadvantageously short life because only its surface is the capturing area. Therefore, in the present invention, the depth type filters, such as a sintered filter, a leaf filter and a candle filter, are preferred. As a material used for the filter, there can be mentioned a material having an iron content of 20% or more and a fluororesin, but a filter made of stainless steel is preferred.

In general, a filter having a filtration accuracy (i.e., pore diameter) of 20 µm or less is used, but it is preferred that the filtration accuracy is 10 µm or less, more advantageously 5 µm or less. With respect to a filter used for the filtration of a molten mixture of an aromatic dihydroxy compound and a diaryl carbonate, since this mixture has a low viscosity, there can be used a filter having high filtration accuracy. In general, there is used a filter having a filtration accuracy of 5 µm or less, preferably 1 µm or less, more preferably 0.5 µm or less, most preferably 0.2 µm or less. Further, a plurality of filters having different filtration accuracies may be connected in series to thereby prolong the life of the filters. There is no particular limitation with respect to the lower limit of the filtration accuracy (pore diameter) of the filter used. However, for the practical use of the filter, it is preferred that the filtration accuracy (pore diameter) is not less than 0.1 µm.

Next, an explanation is given with respect to the washing agents used for the washing treatment of the filter in the method of the present invention: an aqueous solution of a basic compound, an aromatic monohydroxy compound and a molten mixture of an aromatic dihydroxy compound and a diaryl carbonate, the molten mixture containing a basic compound in an amount of from 1 to 10,000 ppb.

With respect to the basic compound used in the method of the present invention, there is no particular limitation as long as the basic compound is weakly basic when it is in the form of an aqueous solution. Generally, when heated together with an aromatic polycarbonate, a basic compound causes discoloration of the aromatic polycarbonate or accelerates a rearrangement reaction of the aromatic polycarbonate. Therefore, in the present invention, it is preferred that the basic compound is selected among the above-mentioned examples of compounds used as a polymerization catalyst. Of such basic compounds, alkali metal compounds, especially, sodium hydroxide and potassium hydroxide are preferred. Further, it is preferred that the pH value of an aqueous solution of the basic compound is within the range of from 7.5 to 10, more advantageously from 8.0 to 9.5, especially advantageously 8.5 to 9.0. When the pH value of the aqueous solution of a basic compound is 7.5 or more, the aqueous solution of a basic compound exhibits a satisfactory washing effect. When the pH value is 10 or less, the terminal hydroxyl group ratio of the aromatic polycarbonate obtained by the reaction effected after the washing treatment of the filter does not vary greatly.

In the present invention, with respect to the temperature at which the washing treatment of the filter with an aqueous solution of a basic compound is performed there is no particular limitation. However, the washing treatment of the filter with an aqueous solution of a basic compound is generally performed at a temperature of from 10 to 100° C., preferably from 20 to 80° C. Further, with respect to the length of time necessary for the washing treatment of the filter with an aqueous solution of a basic compound, there is no particular limitation. However, the length of time necessary for the washing treatment of the filter with an aqueous solution of a basic compound is generally from several minutes to several hundred hours, preferably from 10 minutes to 24 hours, depending on the type of the basic compound, the temperature and the like. The pressure used in the washing treatment of the filter with an aqueous solution of a basic compound can be any of reduced pressure, atmospheric pressure and superatmospheric pressure. The washing treatment of the filter with an aqueous solution of a basic compound in the present invention may be performed by any of a soaking method in which the filter is soaked in a vessel containing an aqueous solution of a basic compound and a spraying or showering method in which an aqueous solution of a basic compound is sprayed or showered onto the filter. However, it is preferred that the washing treatment of the filter with an aqueous solution of a basic compound is performed by soaking the filter in a vessel containing an aqueous solution of a basic compound. In the case of the soaking method, the washing treatment is performed once or more.

It is preferred that the filter is dried after the washing treatment with an aqueous solution of a basic compound. With respect to the method for drying the filter, there is no particular limitation. Examples of methods for drying include air-drying, heat drying using an oven or the like, and vacuum drying under reduced pressure. These methods may be used individually or in combination.

In the present invention, the term "aromatic monohydroxy compound" means a compound represented by the formula: $Ar^5$ OH, wherein $Ar^5$ is the same as $Ar^3$ and $Ar^4$ as defined above. Specific examples of $Ar^5$ include those which are represented by the formulae (5) above. Especially preferred is phenol having the simplest structure.

In the present invention, with respect to the temperature at which the washing treatment of the filter with an aromatic monohydroxy compound is performed, there is no particular limitation. However, the washing treatment of the filter with an aromatic monohydroxy compound is performed generally at a temperature of from the melting point of the aromatic monohydroxy compound +10° C. to 300° C., preferably at the melting point of the aromatic monohydroxy compound +10° C. to 200° C. When phenol, which is preferred, is used, it is preferred that the washing treatment of the filter is performed at a temperature of from 50 to 200° C. Further, with respect to the length of time necessary for the washing treatment of the filter with an aromatic monohydroxy compound, there is no particular limitation. However, the length of time necessary for the washing treatment of the filter with an aromatic monohydroxy compound is generally from several minutes to several hundred hours, preferably 1 hour to 100 hours, depending on the type of the aromatic monohydroxy compound, the temperature and the like. The pressure used in the washing treatment of the filter with an aromatic monohydroxy compound can be any of reduced pressure, atmospheric pressure and superatmospheric pressure. The washing treatment of the filter with an aromatic monohydroxy compound in the present invention may be performed either in a batchwise manner or in a continuous manner. When a batchwise manner is employed, the washing treatment with an aromatic monohydroxy compound is performed once or more.

In the present invention, after the washing treatment with an aromatic monohydroxy compound; for removing the used washing agent from the filter, the filter is subjected to the washing treatment with a molten mixture of an aromatic dihydroxy compound and a diaryl carbonate. In the present invention, it is required that the above-mentioned molten mixture used in the washing treatment contains a basic compound in an amount of from 1 to 10,000 ppb. As a basic compound, those exemplified in connection with the aqueous solution of a basic compound can be used. An example of the above-mentioned molten mixture as a washing agent includes a molten mixture of the raw material monomers for producing an aromatic polycarbonate, the molten mixture containing sodium hydroxide in an amount of from 1 to 10,000 ppb. It is preferred that the washing treatment with the molten mixture is performed, for example, by a process in which, at a temperature of from 150 to 230° C., the molten mixture is charged into the filter and then discharged from the filter, and this charging/discharging operation is repeated several times.

In the production of an aromatic polycarbonate by melt polycondensation, it is conventionally known to the skilled in the art that an aromatic polycarbonate suffers a discoloration as a result of contacting with oxygen during the reaction. Therefore, it is preferred to prevent oxygen from leaking into the reactor-pipeline system during the washing treatments and melt polycondensation. In the present invention, for obtaining an aromatic polycarbonate free of discoloration by a production method in which washing of the filter is performed for a short time, it is effective to purge the reactor-pipeline system with an inert gas prior to the above-mentioned washing treatments. It is also preferred that the aromatic monohydroxy compound used as a washing agent is degassed under reduced pressure, thereby lowering the oxygen concentration of the washing agent. Further, for obtaining an aromatic polycarbonate free of discoloration, it is also effective to prevent oxygen from leaking into the reactor-pipeline system during the time between the completion of the above-mentioned washing treatments of the filter and the start of melt polycondensation.

EXAMPLES

Hereinbelow, the present invention will be described in more detail with reference to the following Example and Comparative Examples, which should not be construed as limiting the scope of the present invention.

The number average molecular weight (hereinafter, frequently abbreviated as "Mn") of an aromatic polycarbonate is measured by gel permeation chromatography (GPC) (solvent: tetrahydrofuran), utilizing the molecular weight conversion calibration curve obtained with respect to the standard mono-disperse polystyrene samples, wherein the molecular weight conversion calibration curve is represented by the following formula:

$$M_{PC}=0.3591 M_{PS}^{1.0388}$$

wherein $M_{PC}$ represents the molecular weight of the aromatic polycarbonate and $M_{PS}$ represents the molecular weight of the standard polystyrene.

The phenol content of a washing agent is measured by liquid chromatography.

The color of the aromatic polycarbonate is evaluated with respect to test specimens each having a thickness of 3.2 cm, in accordance with the CIELAB method (Commission Internationale de l'Eclairage 1976 Lab Diagram), and the yellowness of the test specimens is expressed in terms of the b*-value.

The terminal hydroxyl group ratio (mol %) of the aromatic polycarbonate is measured by performing $^1$H-NMR.

Example 1

Figure 1:
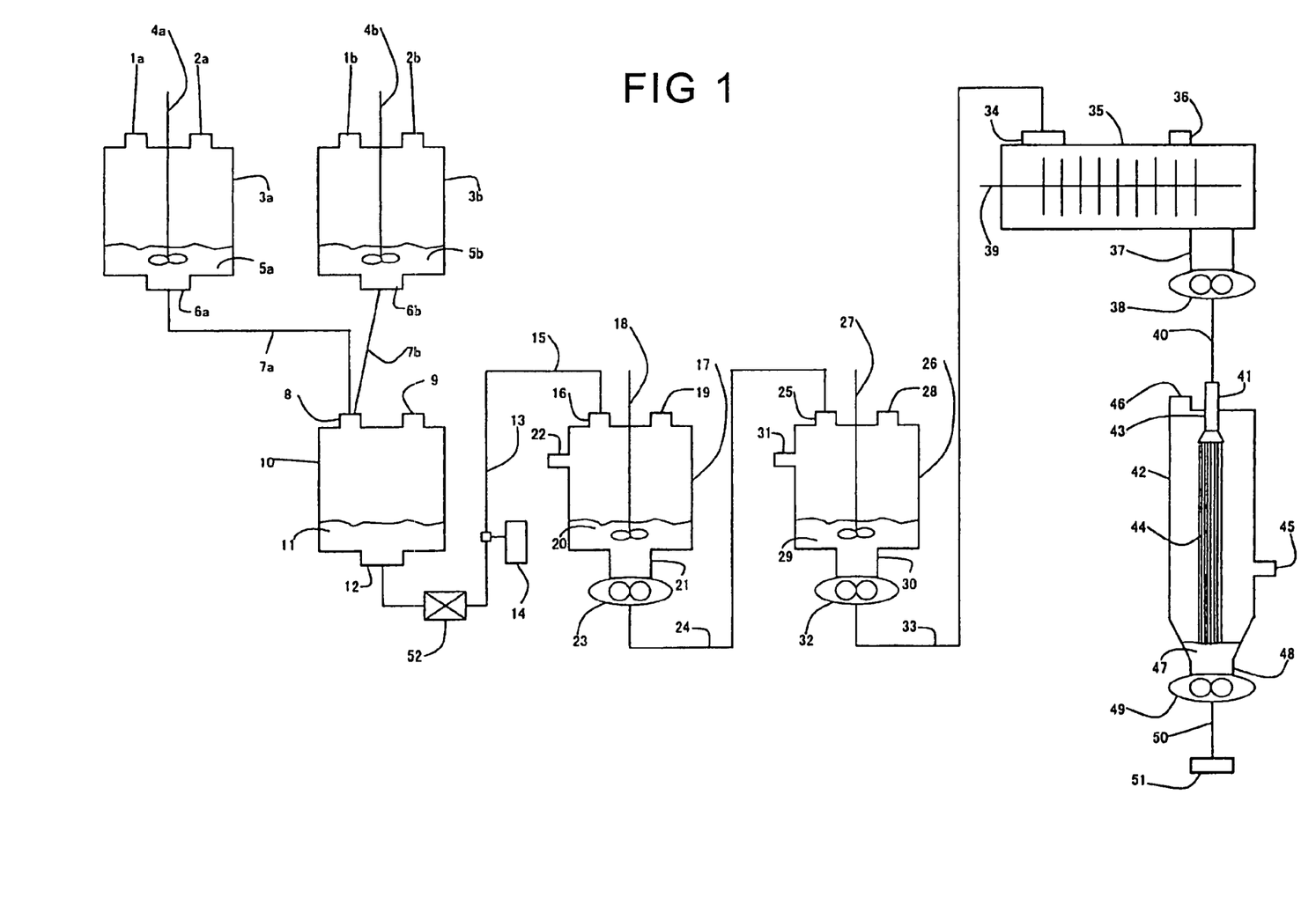
[FIG. 1] A diagrammatic view of one form of a production system used for practicing the method of the present invention.

An aromatic polycarbonate was produced using a process schematically shown in FIG. 1. Specifically, in the reactor-pipeline system used herein, melt-mixing vessels 3a and 3b for melting raw materials were operated alternately in a batchwise manner, while the remainder of the system, including reservoir 10 and the reactors, were operated in a continuous manner. Each of melt-mixing vessels 3a and 3b, and each of vertical agitation type polymerizer vessels 17 and 26 is equipped with an agitation blade. In each of the melt-mixing vessels, vertical agitation type polymerizer vessels and reservoir 10, the liquid-contacting portion thereof is made of SUS 316L stainless steel.

Filter 52 is comprised of two line filters to be used alternatively. Each line filter is made of SUS 316 stainless steel and has an absolute filtration accuracy of 0.3 μm (each line filter is manufactured and sold by Fuji Filter MGF. Co., Ltd., Japan; size: 60 mmφ×260 mm; filtration area: 0.12 m$^2$). The two line filters alternatively used as filter 52 (hereinafter referred to as a first filter and a second filter) are secured in parallel in a pipe so that the two filters can be mutually switched, thereby enabling alternate use of them in the production of an aromatic polycarbonate. Horizontal twin-screw agitation type polymerizer 35 is equipped with a biaxial agitating blade wherein L/D=6 and the rotation diameter is 140 mm. In horizontal twin-screw agitation type polymerizer 35, the liquid-contacting portion is made of SUS 316 stainless steel.

Wire-wetting fall polymerizer 42 is provided with perforated plate 43 which has 50 holes each having a diameter of 5 mm. In wire-wetting fall polymerizer 42 having a perforated plate, the liquid-contacting portion is made of SUS 316L stainless steel. Further, wire-wetting fall polymerizer 42 having a perforated plate is provided with wires 44 made of SUS 316L stainless steel, wherein each of wires 44 has a diameter of 1 mm and is vertically hung from the center of the corresponding hole of perforated plate 43 to a reservoir portion at the bottom of wire-wetting fall polymerizer 42 so that a molten polymer will not fall freely but fall along and in contact with the wires. The wire-wetting fall distance is 8 m. In each of the pipes 7a, 7b, 13, 15, 24, 33, 40 and 50 which connect the melt-mixing vessels and polymerizers, the liquid-contacting portion is made of SUS 316L stainless steel.

A molten monomer mixture was produced in melt-mixing vessels 3a and 3b which were alternately operated in a batch-wise manner. The melt-mixing conditions in each of melt-mixing vessels 3a and 3b were as follows: the reaction temperature was 180° C., the reaction pressure was atmospheric pressure, and the flow rate of nitrogen gas (oxygen concentration: 0.5 ppm) used as a sealing gas was 1 liter/hr. First, into melt-mixing vessel 3a were charged 80 kg of a monomer mixture of a bisphenol A powder and a diphenyl carbonate powder (the molar ratio of diphenyl carbonate to bisphenol A: 1.10) and 7 mg of sodium hydroxide, wherein each of the powders had been individually subjected, five times, to a cycle of vacuum degassing (under 50 mmHg) and introduction of nitrogen gas. Then, melt-mixing of the contents of the vessel was performed for five hours, thereby obtaining a molten mixture. The entire portion of molten mixture 5a was transferred from melt-mixing vessel 3a to reservoir 10 through pipe 7a. Molten mixture 5a to be fed to reservoir 10 has a number average molecular weight (Mn) of 360. Subsequently, another molten mixture was produced by performing substantially the same operation as mentioned above by using melt-mixing vessel 3b, thereby obtaining molten mixture 5b. Molten mixture 5b was transferred to reservoir 10 before all molten polymer 11 contained in reservoir 10 was transferred to the reactors positioned downstream. The above-described cycle of melt-mixing and transfer was repeatedly performed by using melt-mixing vessels 3a and 3b alternately in a batch-wise manner. During the operation, the reservoir 10 was maintained at 180° C. under atmospheric pressure. The molten mixture transferred to reservoir 10 as molten polymer 11 was continuously charged into first vertical agitation type polymerizer vessel 17 at a flow rate of 10 kg/hr through filter 52 (first filter) which was maintained at 180° C.

In first vertical agitation type polymerizer vessel 17 into which molten polymer 11 had been transferred from reservoir 10, a polymerization reaction was continuously performed under polymerization reaction conditions wherein the reaction temperature was 235° C. and the reaction pressure was 100 mmHg, thereby obtaining molten polymer 20. When the volume of molten polymer 20 at the bottom of first vertical agitation type polymerizer vessel 17 reached 20 liters, part of molten polymer 20 was continuously fed to second vertical agitation type polymerizer vessel 26 so that the volume of molten polymer 20 in first vertical agitation type polymerizer vessel 17 was constantly maintained at 20 liters. Molten polymer 20 to be fed to second vertical agitation type polymerizer vessel 26 has a number average molecular weight of 850.

In second vertical agitation type polymerizer vessel 26, a polymerization reaction was continuously performed under polymerization reaction conditions wherein the reaction temperature was 251° C. and the reaction pressure was 6 mmHg, thereby obtaining molten polymer 29. When the volume of molten polymer 29 at the bottom of second vertical agitation type polymerizer vessel 26 reached 20 liters, part of molten polymer 29 was continuously fed to horizontal twin-screw agitation type polymerizer 35 so that the volume of molten polymer 29 was constantly maintained at 20 liters. Molten polymer 29 to be fed to horizontal twin-screw agitation type polymerizer 35 has a number average molecular weight of 2,400.

In horizontal twin-screw agitation type polymerizer 35, a polymerization reaction was continuously performed under polymerization reaction conditions wherein the reaction temperature was 263° C. and the reaction pressure was 1.0 mmHg, thereby obtaining a molten polymer. When the volume of the molten polymer at the bottom of horizontal twin-screw agitation type polymerizer 35 reached 10 liters, the molten polymer was continuously fed to wire-wetting fall polymerizer 42 so that the volume of the molten polymer in horizontal twin-screw agitation type polymerizer 35 was constantly maintained at 10 liters. The molten polymer to be fed to wire-wetting fall polymerizer 42 has a number average molecular weight of 4,500.

In wire-wetting fall polymerizer 42, a wire-wetting fall polymerization reaction was continuously performed under polymerization reaction conditions wherein the reaction temperature was 261° C. and the reaction pressure was 0.6 mmHg, thereby obtaining molten polymer 47. When the volume of molten polymer 47 at the bottom of wire-wetting fall polymerizer 42 reached 20 liters, molten polymer 47 was continuously discharged from wire-wetting fall polymerizer 42 through pipe 50 and withdrawn through withdrawal port 51 so that the volume of molten polymer 47 in wire-wetting fall polymerizer 42 was constantly maintained at 20 liters. Thus, an aromatic polycarbonate was obtained. With respect to the aromatic polycarbonate withdrawn through withdrawal port 51 after the operation of the reactor-pipeline system reached a stable state, the number average molecular weight thereof is 8,500 and the terminal hydroxyl group ratio thereof is 27 mol %, in terms of the amount of terminal hydroxyl groups, based on the amount of all terminal groups of the aromatic polycarbonate.

Subsequently, washing of filter 52 (first filter) was performed as follows. First, the flow path of molten polymer through filter 52 in the pipe was switched from the first filter to the second filter. Then, the first filter was taken out to the outside of the reactor-pipeline system and subjected to washing in the outside of the reactor-pipeline system. Specifically, the first filter was soaked in a vessel containing an aqueous solution of sodium hydroxide (having a pH value of 9) for 1 hour at room temperature (25° C.) so that the entire portion of the first filter was contacted with the solution, thereby performing a first washing of the first filter. Then, the resultant washed first filter was taken out from the vessel and dried. Subsequently, phenol was charged into the first filter and maintained at 60° C. for 1 hour, thereby performing a second washing of the first filter. After the second washing was completed, the phenol was discharged from the first filter. Subsequently, a molten mixture (having a number average molecular weight of 360) was transferred from reservoir 10 and charged into the first filter. The molten mixture in the first filter was maintained at 60° C. for 1 hour and then discharged from the first filter, thereby performing a third washing of the first filter. Thus, washing of the first filter was completed. Subsequently, the first filter was returned into the inside of the reactor-pipeline system, and the flow path of molten polymer through filter 52 was switched from the second filter to the washed first filter, so that a molten polymer flowed through the washed first filter. Thus, the production of an aromatic polycarbonate was continuously performed. In the production of an aromatic polycarbonate after the washing of the first filter, an aromatic polycarbonate was stably obtained and discharged from withdrawal port 51. The obtained aromatic polycarbonate had a number average molecular weight of 8,500 and a terminal hydroxyl group ratio of 27 mol %, in terms of the amount of terminal hydroxyl groups, based on the amount of all terminal groups of the aromatic polycarbonate. At a point in time of 10 hours after the washed first filter was returned into the reactor-pipeline system, the b*-value of the aromatic polycarbonate discharged from withdrawal port 51 was measured. As a result, it was found that the b*-value was as small as 3.0, which is good.

Comparative Example 1

Substantially the same procedure as in Example 1 was repeated except that washing of the first filter was not performed at all. Immediately after the flow path of molten polymer through filter 52 in the pipe was switched from the second filter to the first filter (which was not washed after use), a trouble occurred in that the liquid level in first vertical agitation type polymerizer vessel 17 fluctuated vigorously. Thereafter, the number average molecular weight of the aromatic polycarbonate withdrawn from withdrawal port 51 was decreased to as low as 4,800, the terminal hydroxyl group ratio was increased to as high as 73%, in terms of the amount of terminal hydroxyl groups, based on the amount of all terminal groups of the aromatic polycarbonate, and the b* value was 5.2, which is very poor. It took as long as 24 hours until the molecular weight and terminal hydroxyl group ratio of the aromatic polycarbonate withdrawn from withdrawal port 51 returned to values which are the same as those of the aromatic polycarbonate obtained when the operation of the reactor-pipeline system was stable, that is, a great loss of product occurred.

Comparative Example 2

Substantially the same procedure as in Example 1 was repeated except that instead of the aqueous solution of sodium hydroxide (as a washing agent), water (pH 7) containing no basic compound was used. Immediately after the flow path of molten polymer through filter 52 in the pipe was switched from the second filter to the washed first filter, a trouble occurred in that the liquid level in first vertical agitation type polymerizer vessel 17 fluctuated vigorously. Thereafter, the number average molecular weight of the aromatic polycarbonate withdrawn from withdrawal port 51 was decreased to as low as 4,900, the b* value was 5.9, which is very poor, and the terminal hydroxyl group ratio was increased to as high as 72%, in terms of the amount of terminal hydroxyl groups, based on the amount of all terminal groups of the aromatic polycarbonate. It took as long as 24 hours until the molecular weight and terminal hydroxyl group ratio of the aromatic polycarbonate withdrawn from withdrawal port 51 returned to values which are the same as those of the aromatic polycarbonate obtained when the operation of the reactor-pipeline system was stable, that is, a great loss of product occurred.

Comparative Example 3

Substantially the same procedure as in Example 1 was repeated except that water was used instead of phenol (as a washing agent). Immediately after the flow path of molten polymer through filter 52 in the pipe was switched from the second filter to the washed first filter, a trouble occurred in that the liquid level in first vertical agitation type polymerizer vessel 17 fluctuated vigorously. Thereafter, the number average molecular weight of the aromatic polycarbonate withdrawn from withdrawal port 51 was decreased to as low as 5,300, the b* value was 4.9, which is very poor, and the terminal hydroxyl group ratio was increased to as high as 69%, in terms of the amount of terminal hydroxyl groups, based on the amount of all terminal groups of the aromatic polycarbonate. It took as long as 24 hours until the molecular weight and terminal hydroxyl group ratio of the aromatic polycarbonate withdrawn from withdrawal port 51 returned to values which are the same as those of the aromatic polycarbonate obtained when the operation of the reactor-pipeline system was stable, that is, a great loss of product occurred.

Comparative Example 4

Substantially the same procedure as in Comparative Example 3 was repeated except that instead of an aqueous solution of sodium hydroxide (as a washing agent), an aqueous solution of potassium hydroxide (pH 11) was used. Immediately after the flow path of molten polymer through filter 52 in the pipe was switched from the second filter to the washed first filter, the liquid level in first vertical agitation type polymerizer vessel 17 did not fluctuate. However, thereafter, the number average molecular weight of the aromatic polycarbonate withdrawn from withdrawal port 51 was increased to as high as 9,200, the terminal hydroxyl group ratio was decreased to as low as 23%, in terms of the amount of terminal hydroxyl groups, based on the amount of all terminal groups of the aromatic polycarbonate, and the b* value was 6.0, which is very poor. It took as long as 30 hours until the molecular weight and terminal hydroxyl group ratio of the aromatic polycarbonate withdrawn from withdrawal port 51 returned to values which are the same as those of the aromatic polycarbonate obtained when the operation of the reactor-pipeline system was stable, that is, a great loss of product occurred.

Comparative Example 5

Substantially the same procedure as in Example 1 was repeated except that washing of the first filter was performed as follows. Phenol containing 300 ppb of sodium hydroxide was charged into the first filter and maintained at 150° C. for 1 hour, followed by discharging of the phenol from the first filter. Subsequently, a molten mixture (having a number average molecular weight of 360) was transferred from reservoir 10 and charged into the first filter. The molten mixture in the first filter was maintained at 180° C. for 1 hour and then discharged from the first filter. Thus, washing of the first filer was completed. Immediately after the flow path of molten polymer through filter 52 in the pipe was switched from the second filter to the washed first filter, a trouble occurred in that the liquid level in first vertical agitation type polymerizer vessel 17 fluctuated vigorously. Thereafter, the number average molecular weight of the aromatic polycarbonate withdrawn from withdrawal port 51 was decreased to as low as 5,000, the b* value was 5.2, which is very poor, and the terminal hydroxyl group ratio was increased to as high as 68%, in terms of the amount of terminal hydroxyl groups, based on the amount of all terminal groups of the aromatic polycarbonate. It took as long as 24 hours until the molecular weight and terminal hydroxyl group ratio of the aromatic polycarbonate withdrawn from withdrawal port 51 returned to values which are the same as those of the aromatic polycarbonate obtained when the operation of the reactor-pipeline system was stable, that is, a great loss of product occurred.

INDUSTRIAL APPLICABILITY

The method of the present invention can be advantageously used for stably producing a colorless aromatic polycarbonate while solving the problems that an aromatic polycarbonate produced exhibits a great variation of terminal hydroxyl group ratio, the operation of the production equipment becomes unstable, and a marked product loss occurs due to a lowering of molecular weight or the like.

The invention claimed is:

1. A method for producing an aromatic polycarbonate, which comprises continuously reacting an aromatic dihydroxy compound with a diaryl carbonate in a closed, reactor-pipeline system, said closed, reactor-pipeline system comprising:

a plurality of reactors which are liquid-tightly connected through a pipeline toward an outlet for a final aromatic polycarbonate product, said pipeline comprising one or more pipes, wherein said plurality of reactors include at least two reactors connected in series, and at least one filter secured in the pipe or pipes of said reactor-pipeline system, said method further comprising:

a step of simultaneously or separately taking out the or each filter clogged with foreign matter to the outside of said reactor-pipeline system, a step of subjecting the or each filter to washing in the outside of said reactor-pipeline system, and a step of returning of the resultant washed filter into the inside of the pipe or pipes of said reactor-pipeline system, wherein said washing is performed with the below-mentioned washing agents used in the following order:

an aqueous solution of a basic compound with a pH value of from 7.5 to 10, an aromatic monohydroxy compound, and a molten mixture of an aromatic dihydroxy compound and a diaryl carbonate, said molten mixture containing a basic compound in an amount of from 1 to 10,000 ppb.

2. The method according to claim 1, wherein said aqueous solution of a basic compound has apH value of from 8 to 9.5.

3. The method according to claim 1, wherein said basic compound is an alkali metal hydroxide.

4. The method according to claim 3, wherein said alkali metal hydroxide is at least one member selected from the group consisting of sodium hydroxide and potassium hydroxide.

5. The method according to any one of claims 1 to 4, wherein said aromatic dihydroxy compound is phenol.

* * * * *